United States Patent
Sayilgan et al.

(10) Patent No.: US 9,618,021 B2
(45) Date of Patent: Apr. 11, 2017

(54) ATTACHMENT ARRANGEMENT AND INSTALLATION METHOD

(71) Applicant: Airbus Operations GmbH, Hamburg (DE)

(72) Inventors: Cihangir Sayilgan, Hamburg (DE); Markus Mueller, Hamburg (DE); Henrik Linnemann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 94 days.

(21) Appl. No.: 14/096,970

(22) Filed: Dec. 4, 2013

(65) Prior Publication Data

US 2014/0158279 A1 Jun. 12, 2014

Related U.S. Application Data

(60) Provisional application No. 61/733,930, filed on Dec. 6, 2012.

(30) Foreign Application Priority Data

Dec. 6, 2012 (EP) .................................. 12195885

(51) Int. Cl.
*B32B 41/00* (2006.01)
*F16B 2/12* (2006.01)
(Continued)

(52) U.S. Cl.
CPC .... *F16B 2/12* (2013.01); *F16L 3/02* (2013.01); *H02G 3/32* (2013.01); *Y10T 403/20* (2015.01)

(58) Field of Classification Search
CPC ..... A47B 17/036; A01M 31/02; F16M 11/10; F16M 11/2014; F16M 11/28; F16M 13/02; F16M 13/022
(Continued)

(56) References Cited

U.S. PATENT DOCUMENTS

| 934,676 A | 9/1909 | Langslow |
| 6,119,992 A * | 9/2000 | Stuart ................. A47B 57/583 248/228.6 |
| 2003/0122045 A1 | 7/2003 | Mulford et al. |

FOREIGN PATENT DOCUMENTS

| DE | 102006053996 | 5/2008 |
| DE | 102009022175 | 12/2010 |

OTHER PUBLICATIONS

European Search Report, Jun. 28, 2013.

* cited by examiner

*Primary Examiner* — Michael N Orlando
*Assistant Examiner* — Joshel Rivera
(74) *Attorney, Agent, or Firm* — Greer, Burns & Crain, Ltd.

(57) ABSTRACT

An arrangement for attaching a system to a structure having a base element to retain the system, a positioning element to position the base element at a location on the structure and a fixation device to fix the base element at the location on the structure. The base element has a section for holding the system and a section for being clamped to the structure. The clamping section has an element for alignment on the positioning element. The positioning element has a surface for being bonded to the structure and a positioning section for acting together with the alignment element. The fixation device has a counter element with a clamping area for being positioned on an opposite side of the structure from the clamping section and a fastener for clamping the base element and the counter element to the structure. An installation method for such an attachment arrangement is provided.

8 Claims, 5 Drawing Sheets

(51) Int. Cl.
    *F16L 3/02*      (2006.01)
    *H02G 3/32*      (2006.01)
(58) Field of Classification Search
    USPC .................. 156/60, 64; 248/231.51, 231.71;
                                              211/119.005
    See application file for complete search history.

ATTACHMENT ARRANGEMENT AND INSTALLATION METHOD

CROSS-REFERENCES TO RELATED APPLICATIONS

This application claims the benefit of the U.S. Provisional Application No. 61/733,930, filed on Dec. 6, 2012, and of the European patent application No. 12 195 885.4 filed on Dec. 6, 2012, the entire disclosures of which are incorporated herein by way of reference.

BACKGROUND OF THE INVENTION

The invention concerns an attachment arrangement for the attachment of a system to a structure, in particular lines to a primary structure of an aircraft, and also a method for the attachment of such a system to a structure.

Components in aircraft such as lines, in particular power signal cables, data cables or respective cable harnesses and air-conditioning pipes, are often directly fixed to sections of a primary structure of the aircraft such as stringers, frames or cross beams by means of cable binders. As shown in DE 10 2006 053 996 A1 and also in DE 10 2009 022 175 A1, the lines can however be indirectly attached to the structural sections in combination with attachment arrangements. The attachment arrangements themselves are either fixed to the structure by rivets extending trough respective rivet holes in the structure, by a snap- and click connector or they are bonded to the structure by an adhesive.

SUMMARY OF THE INVENTION

The object of the present invention is to create an attachment arrangement for the attachment of a system to a structure, in particular lines to a primary structure of an aircraft that enables a fast installation of the system. Furthermore, it is the object of the invention to create a fast installation method for the attachment of such a system to a structure, in particular lines to a primary structure of an aircraft.

An inventive attachment arrangement for the attachment of a system to a structure, in particular lines to a primary structure of an aircraft, has a base element for retaining the system, a positioning element for positioning the base element in a location on the structure and a fixation device for the fixation of the base element in the location on the structure. The base element has a holding section for holding the system and a clamping section for being clamped to the structure, wherein the clamping section has an alignment element for the alignment on the positioning element. The positioning element has a bonding surface for being bonded to the structure and a positioning section for acting together with the alignment element. The fixation device has a counter element with a clamping area for being positioned on an opposite site on the structure to the clamping section of the base element and a fastener for clamping the base element and the counter element to the structure.

The inventive attachment arrangement enables a fast and simple initial installation of the system to the structure, since the curing time of the adhesive for bonding the positioning element to the structure is no restrictive time factor. A pressure which is necessary for enable a reliable bonding force is applied by the clamping force of the fastener. An auxiliary clamp for applying the pressure temporary to the positioning element is not necessary. Due to the low load of the attachment arrangement during the assembly compared to the high load during flights, the system can be attached to the base element although the adhesive is not fully cured.

Additionally, the invention enables a fast and simple replacement of the attachment arrangement, since its positioning element remains on the structure. As in a cured state of the adhesive the base element can be removed from the positioning element just by releasing the fastener, a used base element can be easy replaced by a new base element. Thus, a time consuming repositioning of the new base element is omitted. As the adhesive of the positioning element is already fully cured, the new base element is fully operational.

Further, if a new routing of the system is necessary, the attachment arrangements can be easily removed and reinstalled according to the new routing, only the used positioning elements remain in their previous locations on the structure and has to be replaced by new position elements.

In order to avoid any weakening of the structure, for instance by a fastener hole extending through the structure, the base element and the counter element both can have a body region for providing the fastener in a distance to the structure. Additionally, the attachment arrangement can be easy installed in different locations on the structure as fasteners holes in the structure don't has to be provided. Thus, the attachment arrangement enables a flexible and fast consideration to individual line routes according to customer requirements. Additionally, as no fastener holes in the structure are required, the attachment arrangement can be installed independently from the respective structure material such as metal materials or composite materials.

Preferably, the base element and the counter element both have a contact area for supporting each other in an installed state, wherein the body regions are positioned between the contact regions and the clamping regions, and wherein at least the contact region of the base element or the contact region of the base element forms a projecting. The projection projects from the base element or the counter element in relation to the body area. Hereby, a gap is defined between the base element and the counter lateral to the contact regions thus avoiding a hyperstatic fit and enabling the introduction of a clamping force.

In order to simplify the alignment of the base element, the positioning section of the positioning element can have at least one outer surface and the alignment element can have at least one inner surface corresponding with the outer surface. In order to avoid a punctual load on the positioning element, preferably the positioning section has a pyramid-like shape and the alignment element has a corresponding hollow shape with at least two inclined inner surfaces. In another embodiment, the positioning section has the shape of a half cylinder having a flat bonding surface and two semicircular end faces facing away from each other, and the alignment element has an concave inner surface. The half cylinder can be made by cutting a cylinder along its longitudinal direction, for instance. In order to simplify the installation of the base element, the end faces can be inclined to each other.

The installation can be even more simplified when the positioning element is releasably secured in the alignment element. The bonding surface can be activated by removing a protecting layer from it or by putting an adhesive onto it. After the bonding surface is activated, the base element and the position element are positioned simultaneously on the structure. As the engagement of the position element with the alignment element is releasable, the base element can be removed from the structure if necessary.

Preferably, in an installed state the base element is pressed on the alignment element and spaced apart from the structure. Hereby, the clamping force is introduced exclusively in the positioning element so that the bonding of the positioning element is enhanced.

Preferably, the fastener is a releasable form fit and/or tractional element. Hereby, the base element is removable from the structure in a non-destructive way. For instance, the fastener is a screw or a snap- and click pin.

In order to reduce the number of parts of the attachment arrangement and thus in order to more greatly simplify the installation, the fastener can be an integrated part of the base element or the counter element. For instance, the fastener is threaded pin, a snap- and click pin or a snap- and click latch extending from base element or the counter element.

In a preferred method for the attachment of a system to a structure, in particular lines to a primary structure of an aircraft, using a multiplicity of the inventive attachment arrangements, a location on the structure for the attachment of one attachment arrangement is determined. Then, a positioning element is bonded to the structure in the location on the structure. After that, a base element is positioned on the positioning element. Then, a counter element is positioned on an opposite site of the structure from the base element. After that, the base element and the counter element are engaged by a fastener which is positioned at a distance to the structure. Then, the aforementioned steps are repeated until at least some attachment arrangements are located on the structure. Finally, the system is clamped to the holding sections of the base elements.

In one preferred embodiment, the steps "bonding a positioning element to the structure in the location" and "positioning a base element on the positioning element" are done simultaneously. According to this embodiment, the positioning element is releasable fixed to the base element such that the base element and the position elements can be installed in a single step.

Other advantage examples of the embodiment of the invention are the subject of further subsidiary claims.

BRIEF DESCRIPTION OF THE DRAWINGS

In what follows, preferred examples of embodiments of the invention are elucidated in more detail with the aid of the schematic representations. Here.

DETAILED DESCRIPTION OF THE PREFERRED EMBODIMENTS

Figure 1:
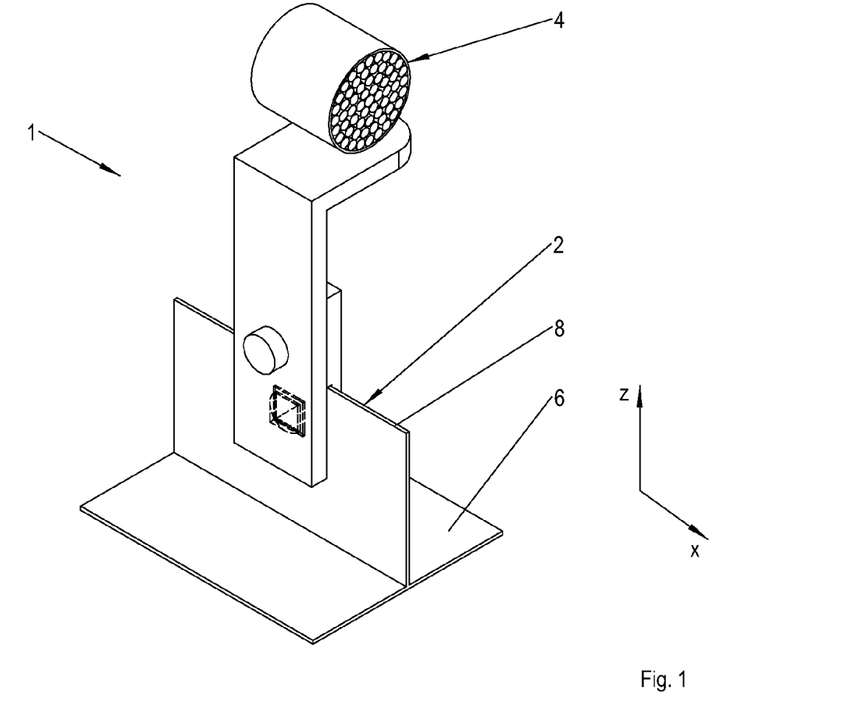
FIG. 1 shows a first embodiment of an installed inventive attachment arrangement.

FIG. 1 shows a first embodiment of an inventive attachment arrangement 1 that is attached to a structure 2 for holding a system 4 in place. In the shown embodiment, the structure is a T-stringer of a not-shown aircraft, having a flange 6 for the fixation of the stringer to the aircraft skin and a web for the attachment of the attachment arrangement 1. The web 8 for connecting the attachment arrangement 1 extends in the x-direction and the z-direction. The system 4 is in the shown embodiment a line, and in particular a cable harness comprising a plurality of single cables. However, the system 4 can also be a single cable or an air-conditioning pipe, for instance. In order to attach the system 4 along its entire length to the structure 2 (x-direction), a multiplicity of attachment arrangements 1 are provided on the flange 6 which are spaced apart from each other in the x-direction and which holds the system 4 at a distance in the z-direction from the web 8.

Figure 2:
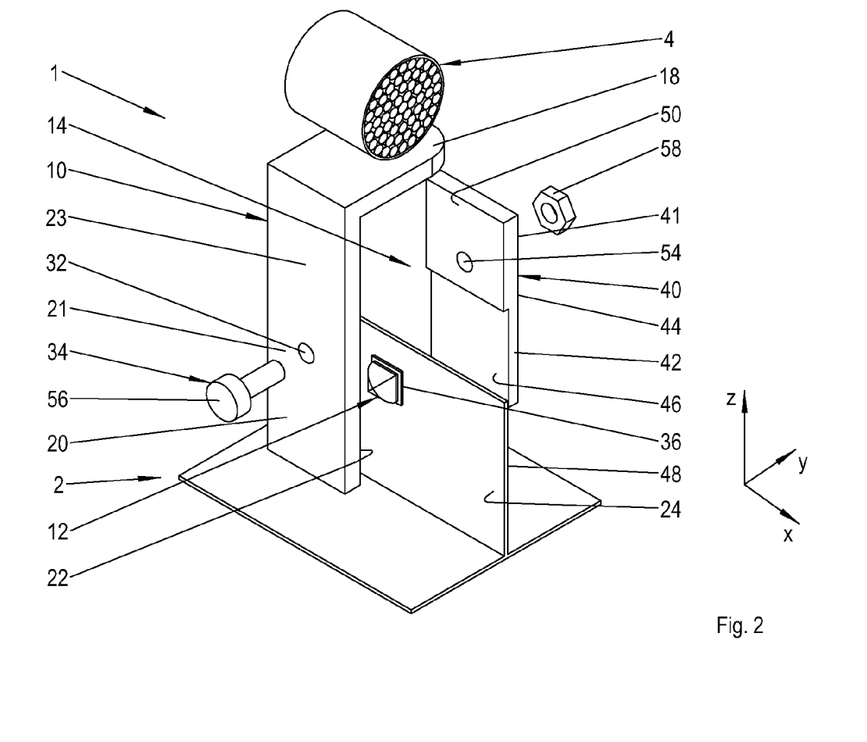
FIG. 2 shows an exploded view of the first embodiment.

As shown in the exploded view according to FIG. 2, the inventive attachment arrangement 1 has a base element 10, a positioning element 12 and a fixation device 14.

The base element 10 has a holding section 18, a clamping section 20, a body section 21 and a contact section 23.

The holding section 18 is used for connecting the system 4 to the attachment arrangement 1. In the shown embodiment, the holding section 18 extends perpendicular to the clamping section 20. The attachment of the system 4 to the holding section 18 is done by not shown cable binders, for instance.

The clamping section 20 enables the clamping of the base element 10 to the structure 2. In particular, as numbered in FIG. 3, the clamping section 20 has an alignment element 26. In the shown embodiment, the alignment element 26 is a recess in the clamping surface 22. The alignment element 26 has a shape that corresponds to a shape of the positioning element 12. In the shown embodiment, the alignment element 26 has a hollow pyramid-like shape with four lateral inner surfaces 28 for being in sliding contact with the positioning element 12. A more detailed view of the alignment element 26 will follow in FIGS. 9 to 16.

As shown in FIG. 2, the body section 21 extends between the clamping section 20 and the contact section 23. It has a hole 32 for receiving a fastener 34 of the fixation device 14 at a distance from the web 8. The hole 32 extends through the clamping section 20 and is positioned between the alignment element 26 and the holding section 18 in such a position that in the installed status, shown in FIG. 1, the fastener 34 is positioned at a distance from the web 8 of the structure 2. Thus, a hole for receiving the fastener 34 in the web 8 is avoided.

According to FIG. 2, the positioning element 12 has a bonding surface 36 for being bonded to the web surface 24 and a positioning section 38 for the alignment of the base element 10. In the shown embodiment, the positioning section 38 has a pyramid-like shape, wherein the bonding surface 36 is the ground surface of the positioning section 38. A more detailed view of the positioning element will follow in FIGS. 9 to 16. In advance to FIGS. 9 to 16, the positioning section 38 can also have a shape of a half cylinder and a hemispherical shape, for instance. Preferably, the positioning section 38 and/or the alignment element 26 have shapes that simplify the positioning of the base element 10 by inclined surfaces 28, 30.

Figure 3:
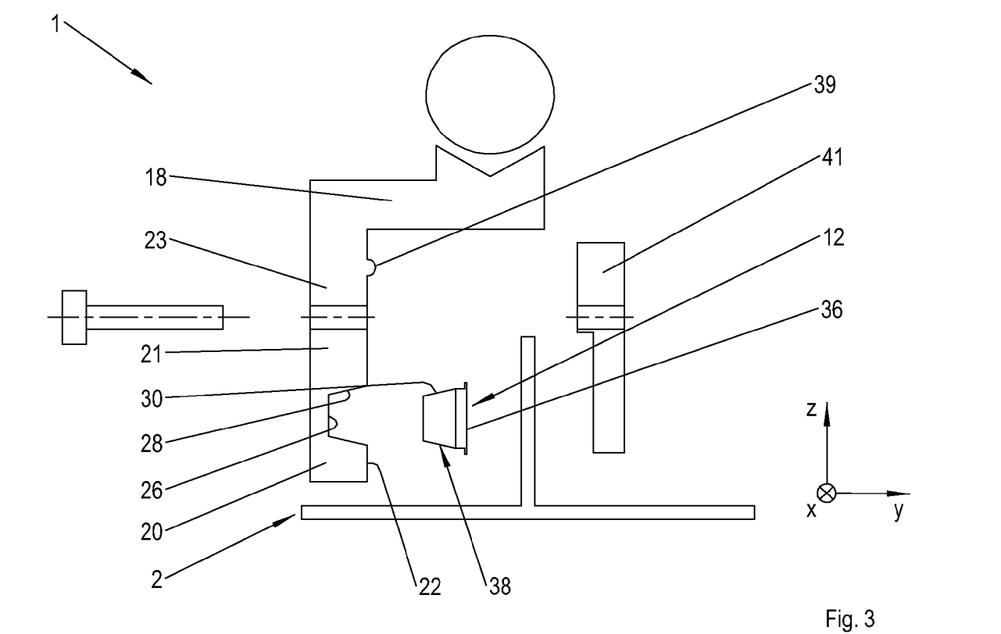
FIGS. 3 to 7 show steps of a preferred installation method of a simplified inventive attachment arrangement according to FIGS. 1 and 2.

The positioning section 38 forms lateral outer surface 30, numbered in FIG. 3, for acting together with the inner inner surfaces 28 of the alignment element 26. In the installed status of the attachment arrangement 1, the positioning section 38 and the alignment element 26 are form fitted, wherein a surface 22 of the clamping section 20 is spaced apart from the web surface 24. Hereby, in the installed state the base element 10 is pressed on the positioning element 12 and thus the base element 10 is not in direct surface contact with the structure 4. In order to achieve this, the inner surfaces 28 and the outer surfaces 30 can have different angles.

Figure 6:
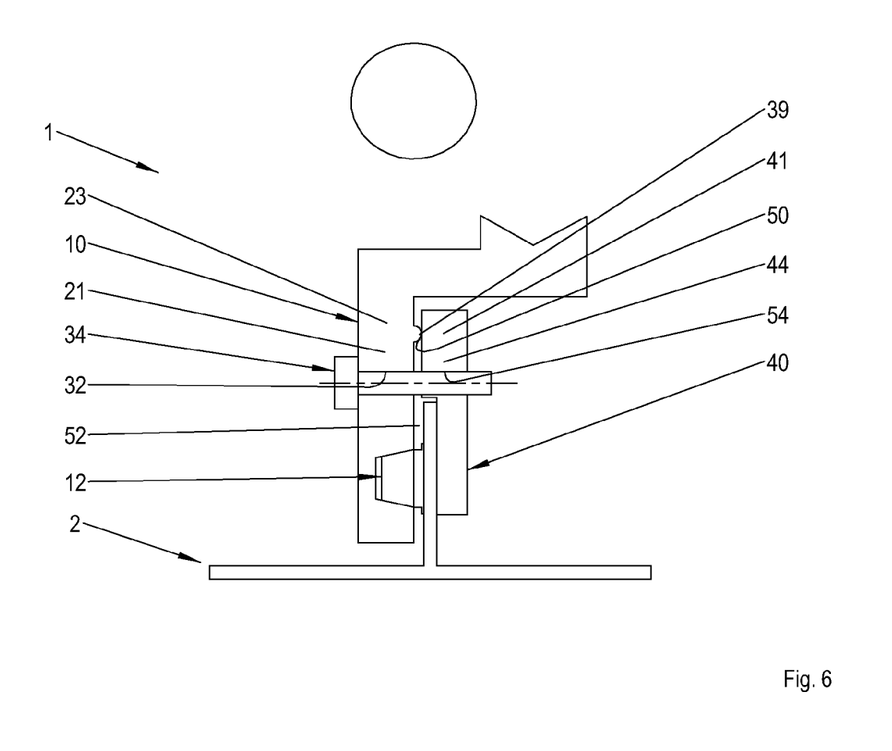

As shown in FIG. 3, in the first embodiment the contact section 23 is positioned between the body section 21 and the holding section 18. The contact section 23 has a projection 39 that projects from the base element 10 in relation to the body section 44. In particular, the projection 39 extends from the contact section in the y-direction and thus transverse to the web 8. Hereby, in the installed state the fastener 34 is positioned between the alignment element 26 and the projection 39, whereby the projection 39 is in contact with a contact area 41 of a counter element 40 of the fixation device 14 (FIG. 6).

As shown in FIG. 2, the fixation device 14 comprises the counter element 40 and the fastener 34. The counter element 40 has a clamping area 42, a body area 44 and the aforementioned contact area 41.

The clamping area 42 forms a plane clamping surface 46 for being pressed against a web surface 48 which faces in an opposite direction from the web surface 24 for receiving the base element 10.

The body area 44 is positioned between the clamping area 42 and the contact area 41. It has a hole 54 extending through the contact surface 50 for receiving the fastener 34 at a distance from the web 4. In the installed state, the body area 44 is spaced apart from the opposite body area 21 of the base element (FIG. 6).

According to FIG. 2, the contact area 41 has a plane contact surface 50 for contacting the projection 39 of the base element 10. In relation to the clamping surface 46 of the clamping element 42, the contact surface 50 is stepped forward in the y-direction or, in other words, the clamping surface 46 is stepped back in relation to the contact surface 50. Thus, in the installed state, the contact area 41 extends over the web 8 in the y-direction such that the projection 39 can be shortened.

In the shown first embodiment, the fastener 34 is a releasable screw comprising a head 56 and a not shown thread for receiving a nut 58. However, the fastener 34 can also be designed as a releasable snap- and click connector. Furthermore, the fastener 34 can also be an integrated part as a threaded pin or a snap- and click latch of the base element 10 and the counter element 14 that acts together with a form fit receptor on the other element 40, 10.

In what follows, a preferred method is presented with the aid of FIGS. 3 to 7 for the purpose of attaching the system 4 to the structure 2 by means of the inventive attachment arrangements 1. For purposes of clearance reasons, the attachment arrangement 1 is only shown in a very simplified manner. For example, the positioning section 38 and the alignment element 26 have a cylindrical shape and the fastener nut 58 is not illustrated in the FIGS. 3 to 7.

As shown in FIG. 3, firstly a location on the structure 2 for the attachment of one of the attachment arrangements 1 is determined.

Figure 4:
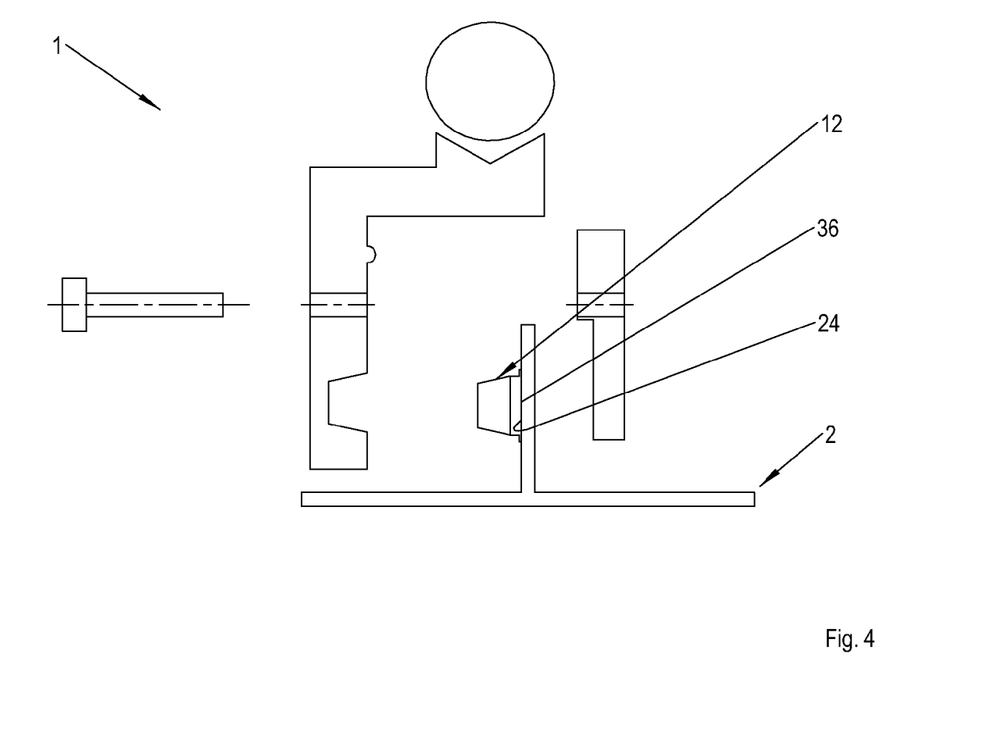

Secondly, as shown in FIG. 4, the positioning element 12 is bonded to the structure 2 in the determined location by activating the bonding surface 36, for instance by putting an adhesive on the bonding surface 36.

Figure 5:
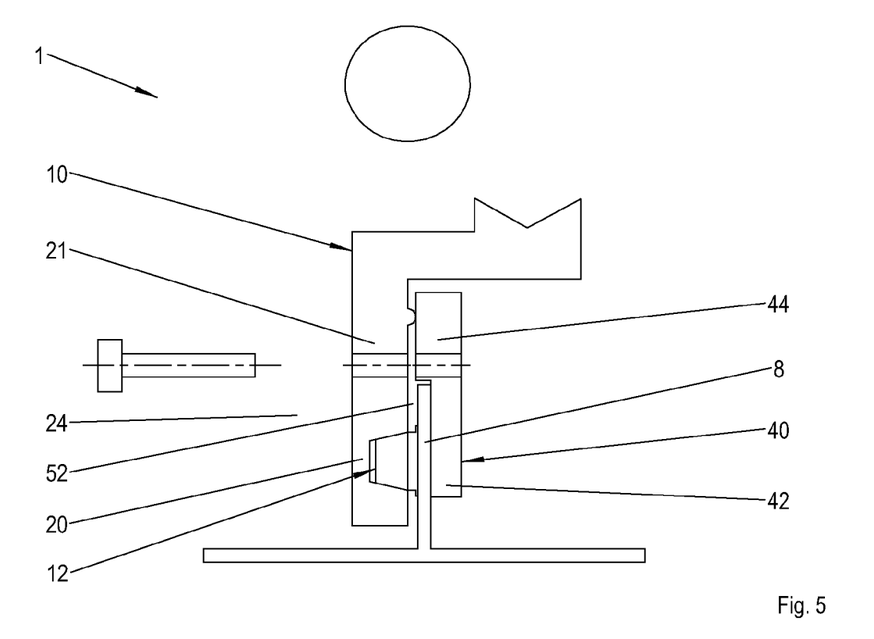

Thirdly, as shown in FIG. 5, although the adhesive has not fully cured, the base element 10 is positioned on the positioning element 12.

Fourthly, as also shown in FIG. 5, the counter element 40 is positioned on the web surface 48 opposite to the first web surface 24. Thus, the web 8 is positioned between the clamping section 20 of the base element 10 and the clamping area 42 of the counter element 40, whereby a gap 52 for ensuring a clamping force is formed between the clamping section 20 and the web 8 and between the body regions 21, 44.

Sixthly, as shown in FIG. 6, the base element 10 and the counter element 40 are engaged by the fastener 34 which is inserted in the holes 32, 54, so that the base element 10 is pressed on the positioning element 12, the counter element is pressed against the web 8 and both elements 10, 40 are pressed together in their contact regions 23, 41.

As a result, the attachment arrangement 1 is releasably fixed to the structure 2 in the determined location. In order to attach further attachment arrangements 1 to the structure 2 the steps 1 to 6 are repeated until the required number of attachment arrangements 1 are installed on the structure 2.

Figure 7:
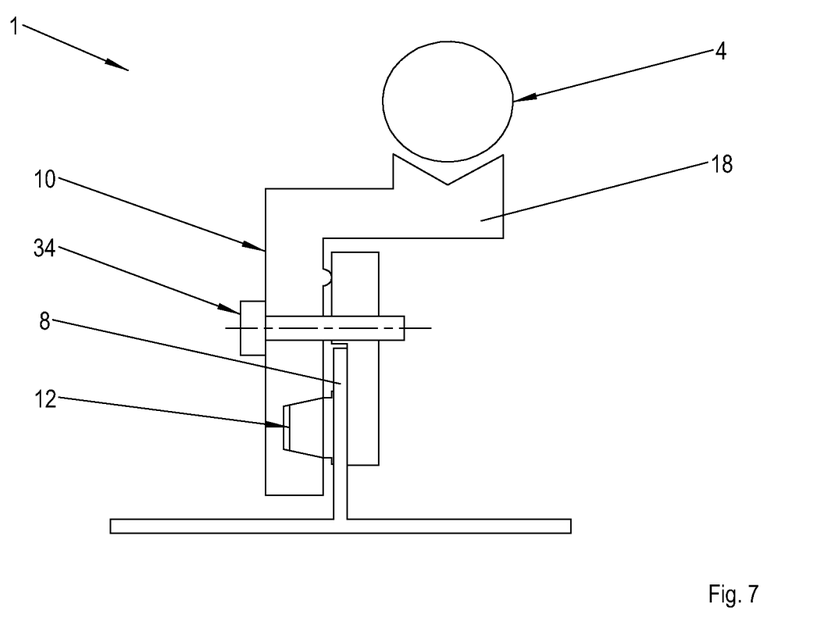

Finally, as shown in FIG. 7, the system 4 is connected to the base elements 10 of the attachment arrangements 1, and in particular to their holding sections 18. Preferably the connection of the system 4 is done by not shown cable binders. For connecting the system 4 to the web 8 the curing level of the adhesive of the positioning element 12 is irrelevant. Due to the clamping of the base element 10 and the counter element 40 by means of the fastener 34, the system 4 can be connected to the respective attachment arrangement 1, although the adhesive is not cured.

If the positioning element 12 is releasably fixed to the base element 10, the second and third steps (bonding the positioning element 12 to the structure 4 in the location and positioning the base element 10 on the positioning element 12) are done simultaneously in a single step. Thus, the total number of steps is reduced to only five steps.

Figure 8:
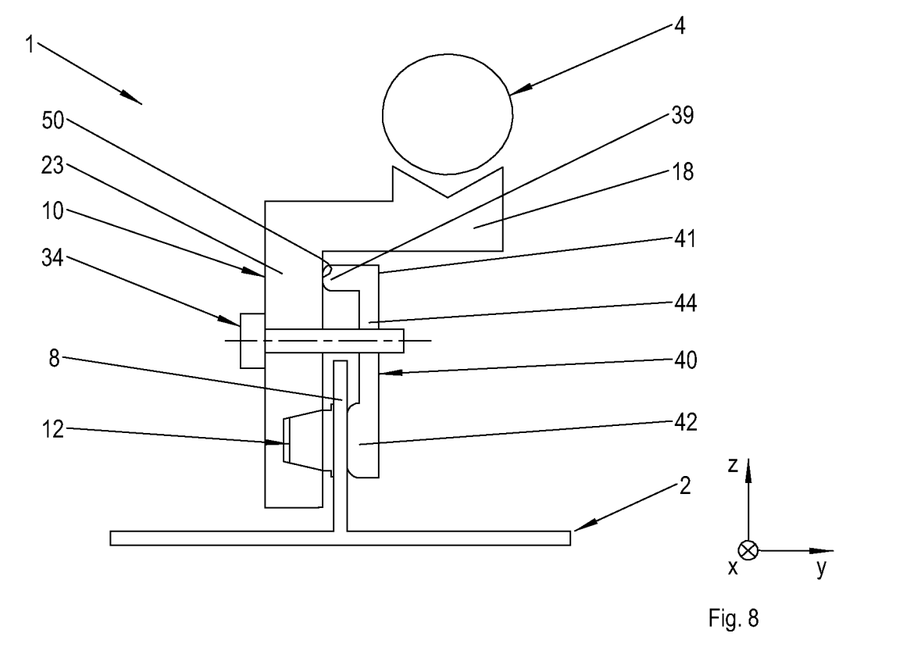
FIG. 8 shows a second embodiment of an installed inventive attachment arrangement.

In FIG. 8, a second embodiment of the attachment arrangement 1 according to the invention is shown. The second embodiment has a based element 10 and a counter element 40 being clamped to a T-shaped structure 2 by a fastener 34 which is spaced apart from the structure 2, whereby the base element 10 is positioned on a positioning element 12 bonded to a web 8 of the structure and the counter element 40 is pressed against the web 8 on an opposite side, and whereby the base element 10 and the counter element 40 are pressed together in a region spaced apart from the fastener 34 between the fastener 34 and a holding section 18 for holding a system 4.

Contrary to the aforementioned first embodiment, a counter section 23 of the base element 10 has a plane contact surface 50 and a projection 39 extending in y-direction transversal to the web 8 of the structure 2 is a part of a contact area 41 of the counter element 40.

Additionally, contrary to the aforementioned first embodiment a body area 44 of the counter element 40 has a reduced cross section in y-direction in relation to its clamping section 42 such that the body section 44 acts as a spring and thickness tolerances of the web 8 can be eliminated.

Further features of the second embodiment are equal to the features of the first embodiment so that for further explanation reference is made to the description of FIGS. 1 to 7.

Figures 9, 10, 11, 12, 13, 14:
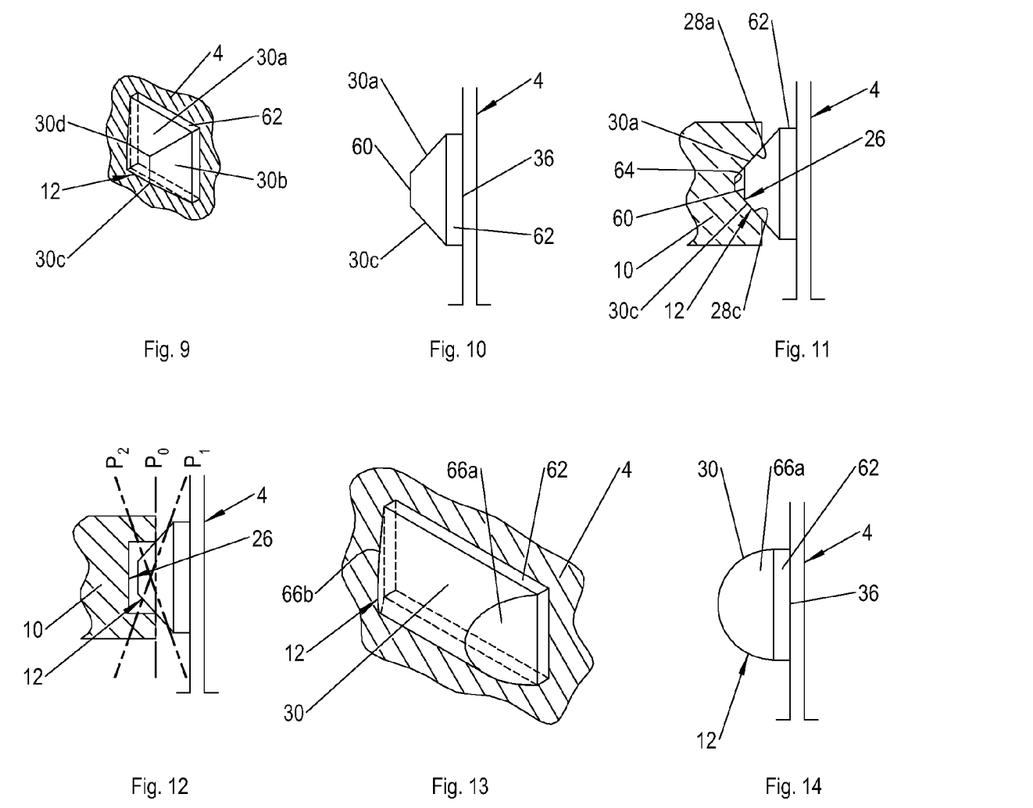
FIGS. 9 to 12 show a detailed view of a first embodiment of a positioning element with corresponding alignment elements.
FIGS. 13 to 16 show a detailed view of a second embodiment of a positioning element with corresponding alignment elements.

In FIGS. 9 to 11 a first embodiment of the positioning element 12 and two embodiments of the alignment element 26 are shown.

According to FIGS. 9 and 10, the positioning element 12 has a pyramid like shape with four inclined identical outer surfaces 30a, 30b, 30c, 30d. Additionally, the positioning element 12 has a flat head surface 60 and a square apron 62 forming the bonding surface 36 for positioning the outer surfaces 30a, 30b, 30c, 30d at a distance from the web 4 in the installed state.

As shown in FIG. 11, the alignment element 26 of the base element 10 has a corresponding hollow structure having four inclined inner surfaces 28a, 28c, . . . facing towards each other. Due to the cross view, only two inner surfaces 28a, 28c are visible.

In the installed state, the inner surfaces 28a, 28c, . . . are in surface contact with the outer surfaces 30a, 30b, 30c, 30c such that a punctual load transfer is avoided. The head surface 60 and thus the positioning element 12 itself is spaced apart from a ground 64 of the alignment element 26.

In FIG. 12 a further embodiment of the alignment element 26 is shown. In order to compensate a part tolerance and/or an assembly tolerance between the web 4, the positioning element 12 and/or the base element 10, the alignment element 26 has the shape of a square recess. Thus, as illustrated by the lines P0, P1 and P3 different offsets of the base element 10 to the positioning element 12 are possible.

In FIGS. 13 to 16 a second embodiment of the positioning element 12 and two further embodiments of the alignment element 26 are shown.

According to FIGS. 13 and 14, the positioning element 12 can also have the shape of a half cylinder having a constant radius, wherein the bonding surface 36 extends in the longitudinal direction of the positioning element 12. Based on this shape, the positioning element 12 has a convex outer surface 30 and two opposite semicircular end surfaces 66a, 66b which are inclined to each other for an easier joining of the base element 10 with the positioning element 12. Additionally, the positioning element 12 has a rectangular apron 62 forming the bonding surface 36 for positioning in particular the convex surface 30 at a distance from the web 4 in the installed state. In its installed state, the positioning element 12 is orientated in the longitudinal direction of the web 4.

Figure 15:
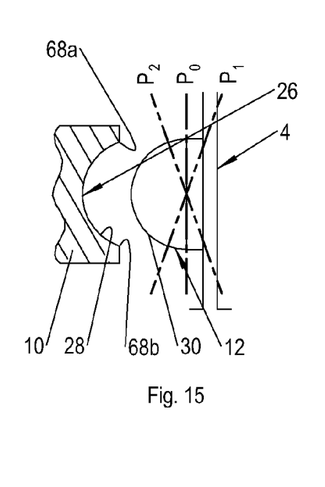

As can be seen in FIG. 15, the alignment element 26 of the base element 10 corresponding to this positioning element 12 has a concave inner surface 28 acting together with the outer surface 30. Preferably, the concave inner surface 28 has the same radius as the convex outer surface 30. However, the radius of the concave inner surface 30 can also be greater than the radius of the convex outer surface 28. As indicated by the lines P0, P1, P2, in order to avoid a punctual load transfer between the positioning element 12 and the alignment element 26 in the case of a tolerance compensation between the web 4, the positioning element 12 and/or the base element 10, the concave surface 28 covers a circular arc which is less than a circular arc of the convex surface 30. Preferable, the circular arc of the convex surface 30 is 180°. However, if the circular arc of the concave surface 30 is also 180°, longitudinal grooves are inserted in the apron 62 for receiving longitudinal edges 68a, 68b of the base element 10 in the case of a tolerance compensation according to lines P1 or P2.

Figure 16:
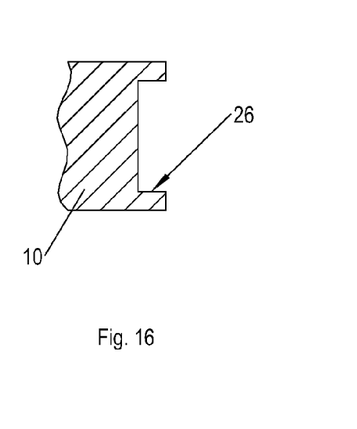

In FIG. 16 a further embodiment of the alignment element 26 is shown. According to this embodiment, the alignment element 26 has the shape of a rectangular recess.

Disclosed is an attachment arrangement for the attachment of a system to a structure in particular lines to a primary structure of an aircraft, having a base element for retaining the system, a positioning element for positioning the base element in a location on the structure and a fixation device for the fixation of the base element in the location on the structure, wherein the base element has a holding section for holding the system and a clamping section for being clamped to the structure, wherein the clamping section has an alignment element for the alignment on the positioning element, wherein the positioning element has a bonding surface for being bonded to the structure and a positioning section for acting together with the alignment element and wherein the fixation device has a counter element with a clamping area for being positioned on an opposite side fn the structure from the clamping section and a fastener for clamping the base element and the counter element to the structure, and an installation method for the installation of such an attachment arrangement.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Attachment arrangement
2 Structure
4 System
6 Flange
8 Web
10 Base element
12 Positioning element
14 Fixation device
18 Holding section
20 Clamping section
21 Body section
22 Clamping surface
23 Contact section
24 Web surface
26 Alignment element
28, 28a, 28c Inner surface
30, 30a, b, c, d Outer surface
32 Hole
34 Fastener
36 Bonding surface
38 Positioning section
39 Projection
40 Counter element
41 Contact area
42 Clamping area
44 Body area
46 Clamping surface
48 Web surface
50 Contact surface
52 Gap
54 Hole
56 Head
58 Nut
60 head surface
62 apron
64 ground
66a, 66b end surface

The invention claimed is:

1. An attachment arrangement for the attachment of a system to a structure, having:
   a base element as a retainer for the system,
   a positioning element configured to position the base element at a location on the structure, and
   a fixation device to fix the base element at the location on the structure,
   wherein the base element has a holding section for holding the system and a clamping section for being clamped to the structure, the clamping section having an alignment element for the alignment of the base element on the positioning element, wherein the positioning element is separately handleable from the base element, wherein the positioning element has a bonding surface comprising an adhesive for being bonded to the structure, such that the positioning element is configured to remain on the structure, wherein the alignment element is formed by a recess in the clamping section of the base element, wherein the positioning element has a positioning section for releaseably acting together with the alignment element only in a form fit manner, and wherein the fixation device has a counter element with a clamping area for being positioned on an opposite side of the structure from the clamping section of the base element and a fastener for clamping the base element and the counter element to the structure.

2. The attachment arrangement in accordance with claim 1, wherein the base element and the counter element both have a body region for providing the fastener at a distance from the structure.

3. The attachment arrangement in accordance with claim 2, wherein the base element and the counter element both have a contact region for supporting each other in an installed state, wherein the body regions are positioned between the contact regions and the clamping regions, and at least one of the contact region of the base element and the contact region of the counter element forms a projection.

4. The attachment arrangement in accordance with claim 1, wherein the positioning section has at least one outer surface and the alignment element has at least one inner surface corresponding with the outer surface.

5. The attachment arrangement in accordance with claim 1, wherein in an installed state the base element is pressed on the alignment element and is spaced apart from the structure.

6. The attachment arrangement in accordance with claim 1, wherein the fastener is at least one of a releasable form fit and a releasable tractional element.

7. The attachment arrangement in accordance with claim 1, wherein the fastener is at least one of an integrated part of the base element and the counter element.

8. A method for the attachment of a system to a structure using a multiplicity of the attachment arrangements according to claim 1, comprising the steps:

determining a location on the structure for the attachment of one attachment arrangement, wherein the positioning element has a bonding surface comprising an adhesive for being bonded to the structure, bonding the positioning element independently from the base element to the structure in the location by means of the adhesive, such that the positioning element remains on the structure, positioning the base element on the positioning element, positioning the counter element by means of the recess in the clamping section of the base element releaseably on the opposite side of the structure from the base element only in a form fit manner, and engaging the base element and the counter element by the fastener in a distance to the structure, repeating the afore-mentioned steps until at least some attachment arrangements are located on the structure, and clamping the system to holding sections of the base elements.

* * * * *